Dec. 6, 1949 V. KLÍMA 2,490,274
METHOD OF REGULATING SHUNT COMMUTATOR MOTORS
Filed Feb. 14, 1948

Inventor:
Vilém Klíma
by Paul A. Smolka

Patented Dec. 6, 1949

2,490,274

UNITED STATES PATENT OFFICE 2,490,274

METHOD OF REGULATING SHUNT COMMUTATOR MOTORS

Vilém Klíma, Prague, Czechoslovakia, assignor of one-half to Moravian Electrical Engineering Works, National Corporation, Olomouc, Czechoslovakia Application February 14, 1948, Serial No. 8,438
In Czechoslovakia December 6, 1946

Section 1, Public Law 690, August 8, 1946
Patent expires December 6, 1966

7 Claims. (Cl. 318—244)

This invention relates to regulating transformers for polyphase shunt commutator A. C. motors, and more particularly to the control of such transformers arranged for use with such motors in which both the stator and rotor are supplied with current.

The known methods of regulating the speed of shunt commutator polyphase A. C. motors include applying to the rotor a varying voltage derived from a single or double induction regulator, changing taps on the stator windings, or utilizing a regulating transformer having taps connected to a control panel having a commutator type control arrangement.

In many respects, these known speed regulating arrangements are unsatisfactory and unduly expensive. If the speed regulation is stepless, it is expensive and has a large reactance impairing the efficiency of the motor. A step by step control is less expensive, but the substantial potential between successive contacts results in burning and pitting of the contacts.

For sub-synchronous and super-synchronous speed regulation, the regulating voltage should be variable not only in value but also in phase. Consequently, it has been the practice to employ several sets of windings in the regulating transformer, including one set for the sub-synchronous speed range and another set for the super-synchronous speed range.

To obviate the foregoing difficulties, the present invention includes a winding or windings having bare or uninsulated portions so that a pair of brushes may be moved in opposing directions along the bared portions of the windings. A continuous stepless speed control is provided by means of which the speed may be varied from a negative maximum to a positive maximum. Phase shifting windings are in circuit connection with the regulated windings to introduce a desired relative phase variation.

It is an object of the present invention to provide a novel regulating transformer for speed control of a shunt commutator polyphase A. C. control.

Another object is to provide such a transformer including phase shifting means.

These and other objects, advantages, and novel features of the invention will be apparent from the following description and the accompanying drawing.

Figure 1:
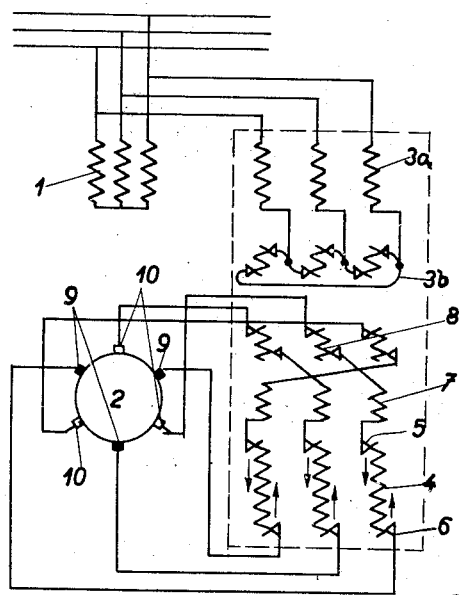
Figs. 1 and 3 are schematic wiring diagrams of control arrangements incorporating the invention.

Referring to Fig. 1, a shunt commutator polyphase A. C. motor is illustrated as having a three-phase stator winding 1, connected to a three-phase A. C. supply line, and a rotor 2, having two sets of three commutator brushes, 9, 10. A regulating transformer is illustrated as having primary windings 3, connected to the supply line, and secondary windings 4.

In accordance with the invention, windings 4 have bare or uninsulated portions for current conducting engagement by movable or adjustable contacts 5 and 6, which are preferably rolling contacts. Contacts 5, 6 move simultaneously in relatively opposed directions over the bared portions of windings 4, so that the voltage derived from these windings varies from a minimum to a maximum.

Contacts 6 apply this derived voltage to the commutator brushes 9, whereas each brush 5 is connected to a winding 7. The latter have the same phase relation as windings 4. Each winding 7 is connected in series circuit relation with an end of a winding 8, which windings are arranged in a phase relation differing from that of windings 4 and 7. The other ends of windings 8 are connected to commutator brushes 10.

The primary windings 3 are divided into windings 3a and 3b, arranged on different cores. Each winding 3b is in series circuit relation with a winding 3a, and windings 3b may be regulated or adjusted as schematically illustrated. Windings 3b have a value for super-synchronous speed which is opposite to that for sub-synchronous speeds, and are conveniently regulated in accordance with the speed difference in either direction from synchronous speed.

Figure 2:
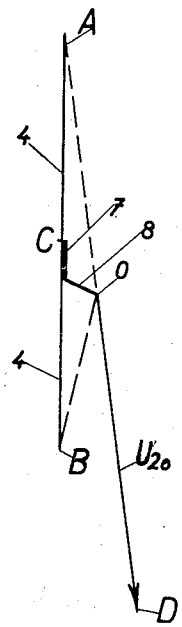
Fig. 2 is a vector diagram of voltage relations involved in the control.

Referring to Fig. 2, the secondary voltage is the vector sum of the voltages in windings 4, 7 and 8, so that it varies from a vector value OA to a vector value OB. With such variation, the voltage of windings 4 varies from the vector value CA to the vector value CB. By moving contacts 5, 6 in opposite directions over the bare portions of windings 4, the vector value of the voltage of windings 4 is varied to vary the phase of the total secondary voltage. The transformer secondary voltage is out of phase with the motor secondary voltage when the stationary voltage $U_{20}=OD$. The transformer secondary voltage $U_{reg}$, varying from CA to CB has such a value and phase relative to the motor secondary voltage that the latter is correctly compensated at all speeds.

For small motors, only three commutator brushes are needed, so that brushes 9 can be omitted and contacts 6 be shunted or short circuited. Within a certain speed range either side of synchronous speed, windings 8 may be omitted. These windings provide for phase variation of the compensating component, so as to provide proper compensation for speeds both above and below synchronous. Under no-load conditions, increased compensation with decreased speed can be effected by simultaneous adjustment of windings 8 and 3b. If the load is constant, adjustment of winding 8 is not necessary. With axial supplying of rotor 2, the regulating transformer can be delta-connected, reducing the load on contacts 5, 6 by one-half.

Figure 3:
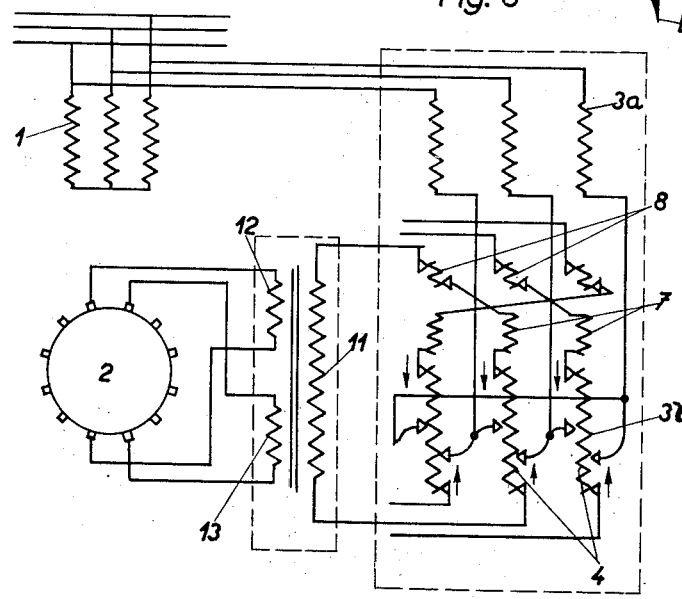

For higher motor outputs, the arrangement of Fig. 3 is useful. In this arrangement, an intermediated transformer, comprising windings 11, 12, 13 is interposed between the rotor 2 and the regulating transformer. At such outputs, the motor requires heavy currents at low voltages, and it is more advantageous for the regulating transformer to work with higher voltages and lower currents. The arrangement of windings 4 as in Fig. 1 may be used instead of the connection of windings 3b and 8 as shown in Fig. 3.

The intermediate transformer can be used to increase the number of phases, such as changing three-phase to twelve-phase. Thus in Fig. 3, 12, 13 are two secondaries on one core, the other two cores being omitted for simplicity.

While specific embodiments of the invention have been shown and described in detail to illustrate the principles of the application thereto, it should be understood that the invention may be otherwise embodied without departing from such principles.

I claim:

1. In a speed regulating arrangement for shunt commutator polyphase A. C. motors having a commutator with two sets of brushes, a regulating transformer for applying compensating potentials to the commutator comprising, in combination, secondary windings having uninsulated portions arranged for current conducting engagement by movable contacts; two sets of adjustable contacts movable simultaneously in opposed directions along such uninsulated winding portions to vary the potential derived from the windings; and circuit means connecting each set of brushes to a different set of adjustable contacts.

2. A transformer as claimed in claim 1 including additional windings on the same cores as said secondary windings and connected in series between one set of contacts and one set of brushes.

3. A transformer as claimed in claim 1 including additional windings on the same core as said secondary windings, in series with the latter, and having a phase relation differing from that of said secondary windings.

4. A transformer as claimed in claim 1 including additional windings on the same core as said secondary windings, in series with the latter, and having a phase relation different from that of said secondary windings, said additional windings being adjustable as to ampere turns.

5. A transformer as claimed in claim 1 in which the transformer primary windings are arranged in two sections on cores having different phase relations.

6. A transformer as claimed in claim 1 including an intermediate transformer between said secondary windings and the commutator to reduce the commutator voltage and increase the commutator current.

7. A transformer as claimed in claim 1 including an intermediate transformer between said secondary windings and the commutator to reduce the commutator voltage and increase the commutator current, the secondary windings of said intermediate transformer having a greater number of phases than the secondary windings of said regulating transformer.

VILÉM KLÍMA.

REFERENCES CITED

The following references are of record in the file of this patent:

UNITED STATES PATENTS

| Number | Name | Date |
|---|---|---|
| 1,438,854 | Piper | Dec. 12, 1922 |
| 2,137,877 | Kramer | Nov. 22, 1938 |
| 2,192,050 | Norcross | Feb. 27, 1940 |
| 2,233,842 | Leischner | Mar. 4, 1941 |
| 2,325,470 | Bonanno et al. | July 27, 1943 |